(12) United States Patent
Minami

(10) Patent No.: US 8,464,546 B2
(45) Date of Patent: Jun. 18, 2013

(54) PIPE STRUCTURE OF ELECTRIC COMPRESSOR

(75) Inventor: Kenichiro Minami, Sagamihara (JP)

(73) Assignee: Nissan Motor Co., Ltd., Kanagawa (JP)

( * ) Notice: Subject to any disclaimer, the term of this patent is extended or adjusted under 35 U.S.C. 154(b) by 1349 days.

(21) Appl. No.: 11/818,200

(22) Filed: Jun. 13, 2007

(65) Prior Publication Data

US 2008/0041084 A1   Feb. 21, 2008

(30) Foreign Application Priority Data

Jun. 22, 2006   (JP) .................................. 2006-172123

(51) Int. Cl.
*B60H 1/32* (2006.01)
*F25D 19/00* (2006.01)

(52) U.S. Cl.
USPC .................................. 62/239; 62/298; 62/299

(58) Field of Classification Search
USPC ........................................... 62/298, 299, 498
See application file for complete search history.

(56) References Cited

U.S. PATENT DOCUMENTS

| 5,651,260 | A  | * | 7/1997 | Goto et al. ...................... 62/126 |
| 6,619,933 | B2 | * | 9/2003 | Ikeda ......................... 417/410.1 |
| 6,626,652 | B2 | * | 9/2003 | Koyama et al. ............ 417/423.1 |
| 2007/0001062 | A1 | * | 1/2007 | Kirby ............................. 248/65 |

FOREIGN PATENT DOCUMENTS

JP   2004-190525   7/2004

OTHER PUBLICATIONS

Patent Abstracts of Japan for Japanese Publication No. 2004-190525, Publication date Jul. 8, 2004 (2 pages).

* cited by examiner

*Primary Examiner* — Judy Swann
*Assistant Examiner* — Filip Zec
(74) *Attorney, Agent, or Firm* — Osha Liang LLP

(57) ABSTRACT

A pipe structure of an electric compressor has an electric compressor disposed in an engine compartment of a vehicle and configured to be driven by a battery power source to compress a refrigerant, a harness connecting portion disposed on an upper surface of the electric compressor and electrically connecting a harness to the electric compressor, and a pipe connecting portion disposed forward of the harness connecting portion and connecting an air conditioner pipe to the electric compressor. At least a part of the air conditioner pipe is disposed above the electric compressor and forward of the harness connecting portion.

10 Claims, 5 Drawing Sheets

Prior Art

PIPE STRUCTURE OF ELECTRIC COMPRESSOR

PRIORITY APPLICATION

This application claims priority from Japanese Patent Application No. 2006-172123, filed Jun. 22, 2006, the contents of which are hereby incorporated by reference in their entirety.

BACKGROUND OF THE INVENTION

1. Field of the Invention

The present invention relates to a technical field of a pipe structure of an air conditioner pipe of an electric compressor.

2. Description of the Related Art

According to a conventional electric compressor having an inverter circuit for an air conditioner mounted in an engine compartment of a vehicle, the inverter circuit having an electric switching element, a capacitor, etc. is hermetically accommodated in an inverter case, so that the inverter circuit is protected from impact caused by a collision. One example of the conventional electric compressor is shown in Japanese Patent Application Laid-open No. 2004-190525.

In a conventional electric compressor, a high voltage connector to which a high voltage harness is connected projects from an upper surface of an inverter case. The high voltage connector is operable to attach and detach the high voltage harness from the inverter case. During a head-on collision, a radiator or a fan shroud that is forced rearwards from the front of the vehicle comes in contact with the high voltage connector, which may damage the high voltage connector.

SUMMARY OF THE INVENTION

In accordance with one or more embodiments of the present invention, a pipe structure of an electric compressor comprises an electric compressor disposed in an engine compartment of a vehicle and configured to be driven by a battery power source to compress a refrigerant, a harness connecting portion disposed on an upper surface of the electric compressor and electrically connecting a harness to the electric compressor, and a pipe connecting portion disposed forward of the harness connecting portion and connecting an air conditioner pipe to the electric compressor. At least a part of the air conditioner pipe is disposed above the electric compressor and forward of the harness connecting portion. Here, although the term "engine compartment" is used, the present invention is not limited to vehicles having an engine, and the term "engine compartment" may refer to any compartment in the vehicle in which an electric compressor is disposed, even if the vehicle has no engine, such as an electric vehicle, fuel cell vehicle, etc. Further, the air conditioner pipe may be at least one of a refrigerant suction air conditioner pipe and a refrigerant discharging air conditioner pipe.

A piping method for an electric compressor comprises protecting a harness connecting portion disposed on an upper surface of the electric compressor from parts located in front of the electric compressor by disposing an air conditioner pipe in front of the harness connecting portion.

Other aspects and advantages of the invention will be apparent from the following description and the appended claims.

DETAILED DESCRIPTION

Figure 1:
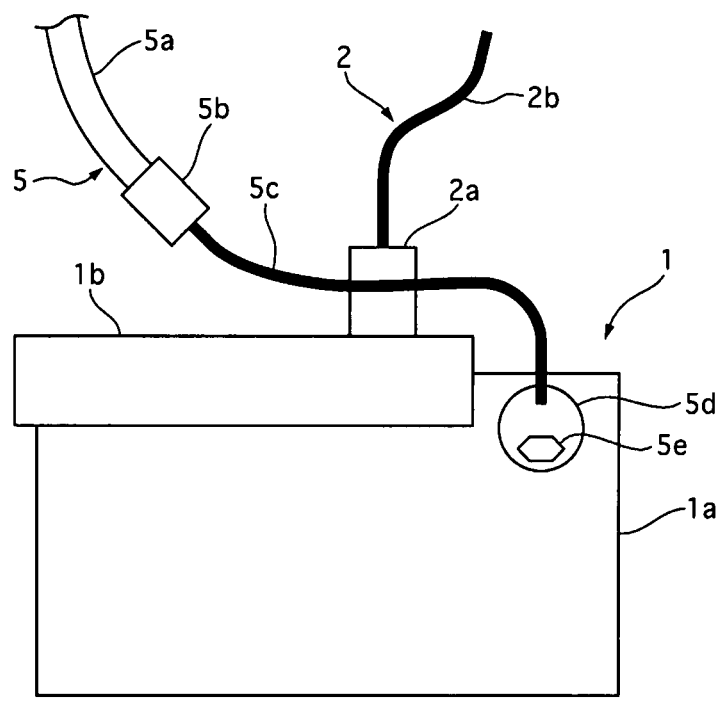
FIG. 1 is a front view of an electric compressor with a pipe structure according to one or more embodiments of the present invention.

Exemplary embodiments of the invention will be described with reference to the accompanying figures. Like items in the figures are shown with the same reference numbers.

In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

The axes in the present descriptions and claims are given with respect to the vehicle in which the pipe structure for the electric compressor according to one or more embodiments of the present invention is to be disposed. Thus, longitudinal refers to the front-to-back axis on which the vehicle would normally travel, and lateral refers to the side-to-side axis on the ground plane perpendicular to the longitudinal axis. Vertical refers to the up to down axis perpendicular to the ground plane. Thus, the terms "forward" and "front" refer to a forward direction on the longitudinal axis of the vehicle, the terms "rearwards" and "rear" refer to a rearward direction on the longitudinal axis of the vehicle, and the terms "upper" and "above" refer to an upper direction on the vertical axis of the vehicle.

In a conventional air conditioner for vehicle, an electric compressor for motor-driving a compressor which compresses a refrigerant is commonly used. The electric compressor is effective for vehicles that cannot, even if temporarily, obtain power of an engine to provide stable air conditioning, such as electric cars, hybrid cars, etc. In the conventional air conditioner, a motor is generally driven by high voltage electricity of 100 V or higher, and the motor compresses a refrigerant.

In most cases, the electric compressor in the vehicle is fixed to an engine wall surface, located in the front area of the engine compartment, using a layout of the electric compressor similar to the conventional belt-driving type compressor. This is done so that common parts can be used, which reduces cost. In this case, however, the electric compressor is influenced by a head-on collision.

As used herein, "engine compartment" refers to an area of a vehicle in which an electric compressor is disposed, where generally an engine or electric motor is contained.

Vehicles are generally designed such that a high voltage circuit is shut down during a head-on collision, improving safety when the vehicle is damaged in the collision. However, since the high voltage shut down system may fail during the head-on collision, it is preferable that the high voltage circuit be less prone to damage.

For example, according to an electric compressor for a car air conditioner described in Japanese Patent Application Laid-open No. 2004-190525, an inverter circuit having an electric switching element and a capacitor is hermetically accommodated in an inverter case. With this configuration, the safety of the inverter circuit against collision is improved. This improves the internal structure of the electric compressor.

Figure 2:
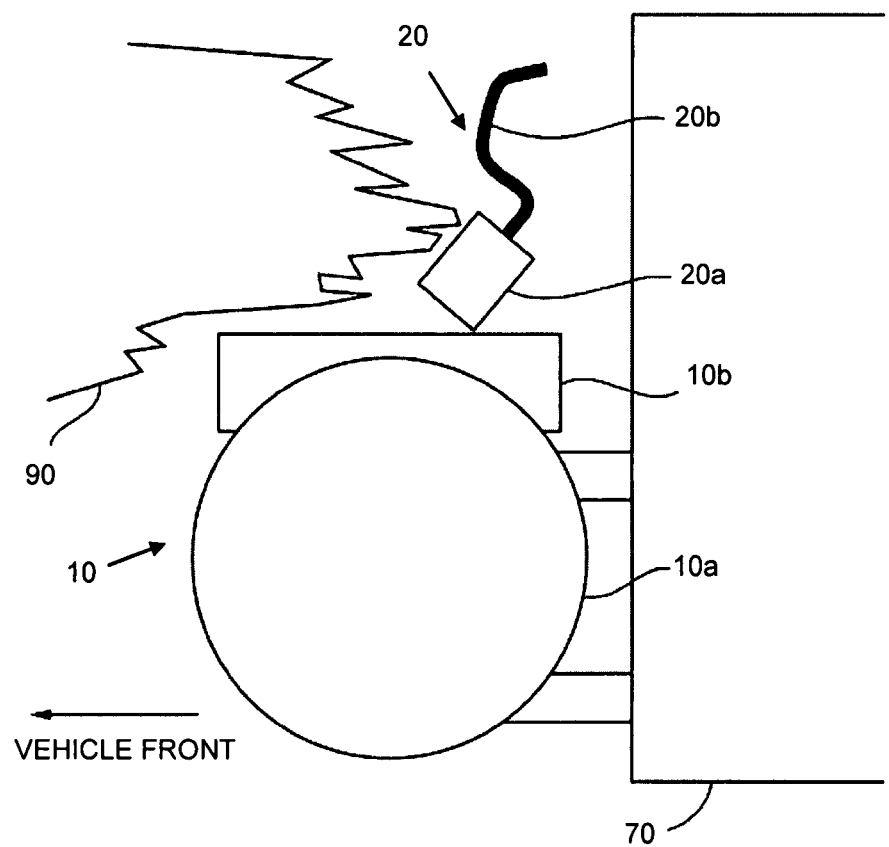
FIG. 2 shows a conventional electric compressor during a collision.

FIG. 2 shows a conventional electric compressor during a collision, in which a high voltage harness 20 having a harness 20b and a connector 20a are damaged. During the collision, a part 90, such as a radiator or a fan shroud positioned in front of an electric compressor 10, is forced rearwards from the front of the vehicle and comes in contact with the connector 20a, thereby damaging the high voltage harness connector 20a.

That is, the high voltage harness 20 which supplies high voltage to the electric compressor 10 is mounted to an upper surface of the electric compressor 10 while taking the operation of attaching and detaching the high voltage harness 20 into consideration. This position is weaker in strength than an interior of the electric compressor 10 protected by a casing, because the high voltage harness is not protected from collision.

One method for protecting a high voltage harness or its connector during a head-on collision involves disposing a high strength bracket on a front surface of the harness, but the strengthened high voltage harness can be expensive since the costs of material and machining labor involved in manufacturing the high strength bracket are higher than that of a general bracket.

Another method involves positioning the high voltage harness or its connector in a gap between an electric compressor and an engine behind the electric compressor. However, attaching and detaching of the connector during manufacturing at automobile manufacturing plants, car garages, etc. becomes much more difficult.

FIG. 1 is a front view of an electric compressor 1 with a pipe structure according to one or more embodiments of the present invention. The pipe structure of the electric compressor includes an electric compressor 1, a high voltage harness 2, and a pipe portion 5 from which a refrigerant is discharged. The electric compressor 1 is mounted on a vehicle, and constitutes a refrigeration cycle of an air conditioner.

The electric compressor 1 includes a compressor motor section 1a and an inverter section 1b. A compressor and an electric motor are integrally accommodated in the compressor motor section 1a. The compressor motor section 1a is driven by the motor, and the compressor motor section 1a thereby compresses a refrigerant discharged from an evaporator (not shown), and discharges the same into a capacitor (not shown). The inverter section 1b is provided on an upper surface of the compressor motor section 1a. A printed wire circuit board on which an inverter circuit is mounted is accommodated in the inverter section 1b. The inverter circuit converts DC electricity to three-phase AC.

The high voltage harness 2 includes a harness connecting portion 2a and a harness portion 2b. The harness connecting portion 2a is mounted on an upper surface of the inverter section 1b, and is electrically connected to the inverter circuit in the inverter section 1b. The harness portion 2b is connected to a high voltage battery (not shown), which is a driving source of a vehicle driving motor.

The pipe portion 5 includes a hose portion 5a, a swaged portion 5b, an air conditioner pipe ("aluminum pipe portion") 5c, a pipe connecting portion ("connector portion") 5d, and a pipe mounting bolt 5e. The hose portion 5a and the aluminum pipe portion 5c are connected to each other through the swaged portion 5b. A tip end of the aluminum pipe portion 5c is connected to a front surface of the compressor motor section 1a through the connector portion 5d fixed to the compressor motor section 1a. The connector portion 5d is fixed to the compressor motor section 1a by the pipe mounting bolt 5e. One of ordinary skill in the art will appreciate that other materials of similar or greater strength may be used instead of aluminum for the pipe portion 5. For example, steel or a strong thermoplastic may be used for pipe portion 5c.

The aluminum pipe portion 5c extends from the connector portion 5d to a location higher than the upper surface of the compressor motor section 1a, and is bent in the lateral direction at a vertical position of the connector portion 2a of the high voltage harness 2, and a portion of the connector portion 2a in front of the vehicle is extended in a lateral direction. A pipe portion through which a refrigerant is sucked out of the electric compressor is also connected to the compressor motor section 1a together with the refrigerant discharging pipe portion 5, but for simplicity, only the refrigerant discharging pipe portion 5 will be explained, and illustration and explanation of the refrigerant sucking pipe portion will be omitted. Further, one of ordinary skill in the art will recognize that although a we have referred to the pipe in FIG. 1 as the refrigerant discharging pipe 5, it would be within the scope of the present invention for the pipe to be the refrigerant suction pipe.

In the pipe structure of the electric compressor of FIG. 1, the aluminum pipe portion 5c of the pipe portion 5 is positioned in front of the connector portion 2a of the high voltage harness 2. With this configuration, during a head-on collision, a collision load is received by the aluminum pipe portion 5c, and collision energy transmitted to the connector portion 2a can be reduced. In accordance with one or more embodiments, since the pipe portion 5 is already a commonly installed component of the air conditioner, the number of parts need not be increased. That is, because the pipe portion 5, which is an indispensable part of the air conditioner, absorbs the collision energy, damage to the connector portion 2a is reduced without adding extra parts.

During a head-on collision, parts such as a radiator and a fan shroud located in front of the electric compressor 1 may be damaged and hit the electric compressor 1, but due to the aluminum casting, the aluminum pipe portion 5c has high rigidity. Further, even when the aluminum pipe portion 5 is damaged, this only causes leakage of a refrigerant, which causes little problem in terms of safety.

Further, a front portion of the connector portion 5d of the aluminum pipe portion 5 extends in the lateral direction. This configuration makes it possible to further enhance the rigidity of the aluminum pipe portion 5 in the longitudinal direction of the vehicle, and to further reduce damage to the connector portion 5d.

Generally, a central portion of the air conditioner pipe is a rubber hose so that a fluctuation of an engine can be absorbed. However, in many cases, both ends of the air conditioner pipe are aluminum pipes. In the pipe structure of the electric compressor of FIG. 1, attention is paid to this point. The aluminum pipe portion is positioned in front of the high voltage connector, such that objects such as the radiator and the fan shroud which are forced rearwards during a collision are received by the aluminum pipe portion, thereby helping protect the connector portion of the high voltage harness from damage.

A pipe structure of an electric compressor according to one or more embodiments of the present invention has one or more of the following advantages.

A refrigerant flows through the aluminum pipe portion 5c which is connected to the connector portion 5d. The aluminum pipe portion 5c is positioned to extend in front of the connector portion 2a. The high voltage harness 2 for introducing the battery power source is connected to the connector portion 2a. Thus, during a head-on collision, a collision load is received by the aluminum pipe portion 5c, and the collision energy transmitted to the connector portion 2a can be reduced.

Further, since the aluminum pipe portion 5c is already present in a vehicle air conditioner, the extra parts are not necessary. As a result, it is possible to protect the connector portion 2a from damage without increasing cost.

Since the front side of the connector portion 5d of the aluminum pipe portion 5 extends in the lateral direction, the rigidity of the aluminum pipe portion 5 in the longitudinal direction can further be enhanced, and better protects the connector portion 5d from damage.

Figure 3:
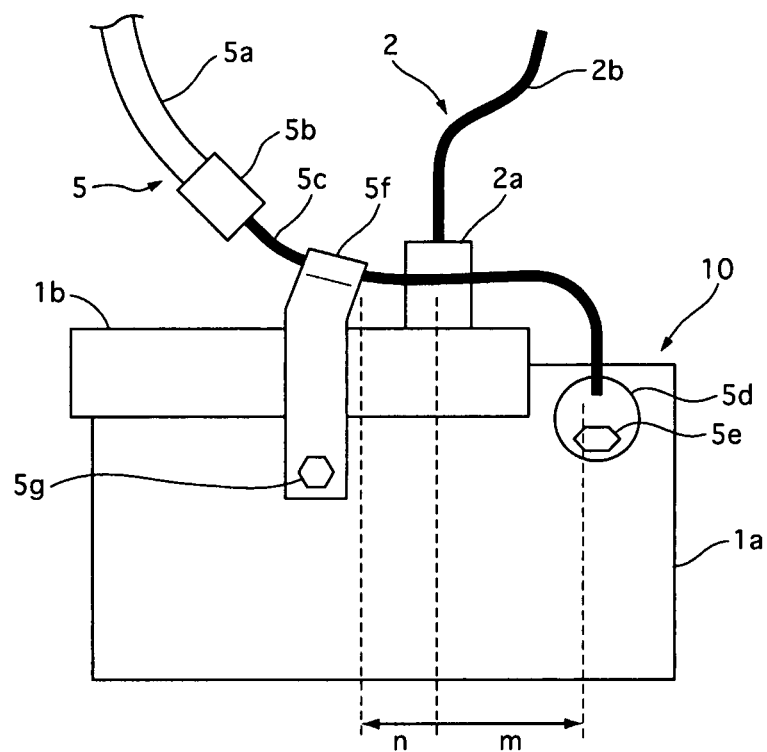
FIG. 3 is a front view of an electric compressor with a pipe structure according to one or more embodiments of the present invention.

FIG. 3 is a front view of an electric compressor 10 with a pipe structure according to one or more embodiments of the present invention. In the electric compressor 10 with a pipe structure shown in FIG. 3, a bracket 5f and a bracket bolt 5g are added to the embodiment shown in FIG. 1.

Figure 4:
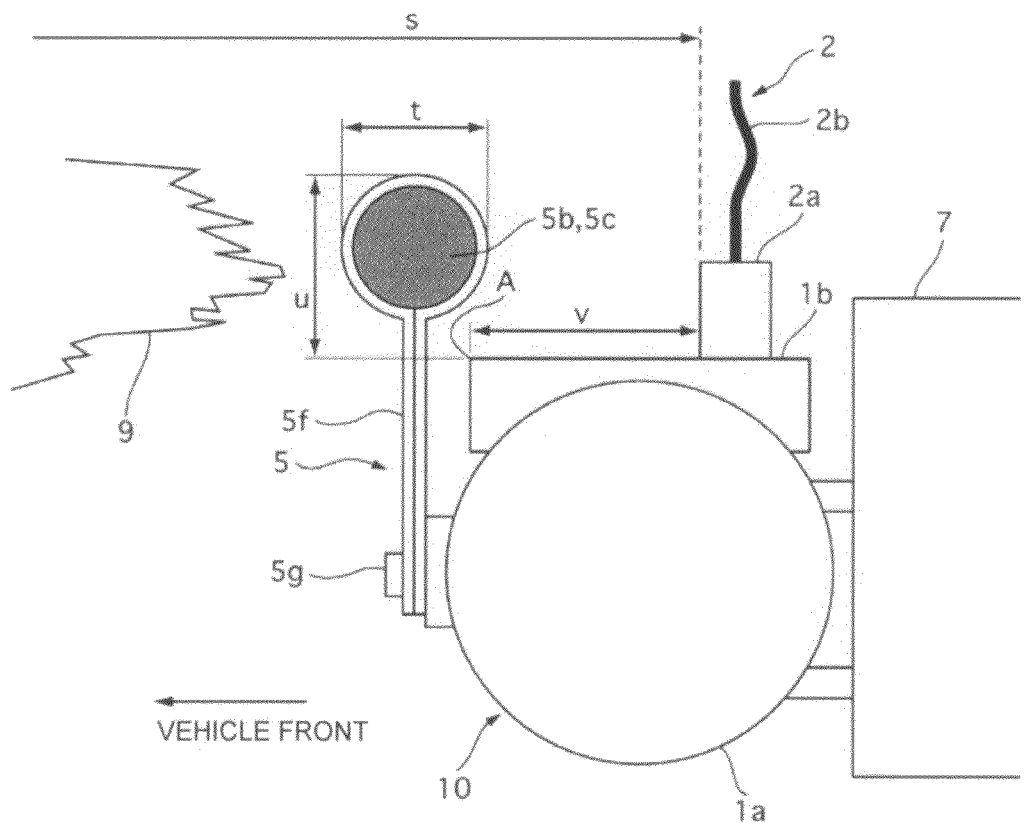
FIG. 4 is a side view of the electric compressor shown in FIG. 3.

An upper end of the bracket 5f supports the aluminum pipe portion 5c, and a lower end of the bracket 5f is fixed to a front surface of the compressor motor section 1a by the bracket bolt 5g. As shown in FIG. 4, both ends of plate-shaped members of the bracket 5f are bent in a two-fold manner, and the bent portion is formed into a circular shape extending along a circumference of the aluminum pipe portion 5c. A diameter t of the support portion of the aluminum pipe portion 5c is set to be larger than the height of the connector portion 2a.

In the bracket 5f, a vertical distance u from an upper front edge A of the inverter section 1b to the uppermost point of the bracket 5f is set to be less than a longitudinal distance v from the upper front edge A of the vehicle to the connector portion 2a of the high voltage harness 2.

In one or more embodiments of the present invention, to enhance the protecting effect of the high voltage harness 2 during a head-on collision, a distance between the aluminum pipe portion 5c and the connector portion 2a is small. In one or more embodiments of the present invention, the aluminum pipe portion 5c has two fixed points (supporting points of the aluminum pipe portion 5c by the connector portion 5d and the bracket 5f), and thus, distances m and n shown in FIG. 3 can freely be selected. In accordance with one or more embodiments of the present invention, one of distances m and n may be zero, and the connector portion 2a of the high voltage harness 2 may effectively be protected by the rigidity of the fixed points.

The aluminum pipe portion 5c being positioned in front of the connector portion 2a of the high voltage harness 2 is effective for protecting the high voltage harness 2 damage during a head-on collision. In the case of a serious collision, for example, as shown in FIG. 4, there is a possibility that a rigid part 9 may be forced rearwards a distance s, wherein the part 9 ends up in a location just in front of the connector portion 2a. Here, small pieces which have low rigidity and are already damaged are received by the aluminum pipe portion 5c, and the connector portion 2a is protected.

Because the diameter of the support portion of the aluminum pipe portion 5c of the bracket 5f is t, when the collision energy is large, the rigid part 9 plastically deforms the bracket 5f and the distance the rigid part 9 is forced rearwards effectively becomes s+t.

In accordance with one or more embodiments of the present invention, the vertical distance u between the uppermost point of the bracket 5f and the upper front edge A of the inverter section 1b is set to be less than the distance v from the connector portion 2a of the high voltage harness 2 to the upper front edge A. Further, a diameter t of the support portion of the aluminum pipe portion 5c of the bracket 5f is set to be larger than a height of the connector portion 2a.

Figure 5:
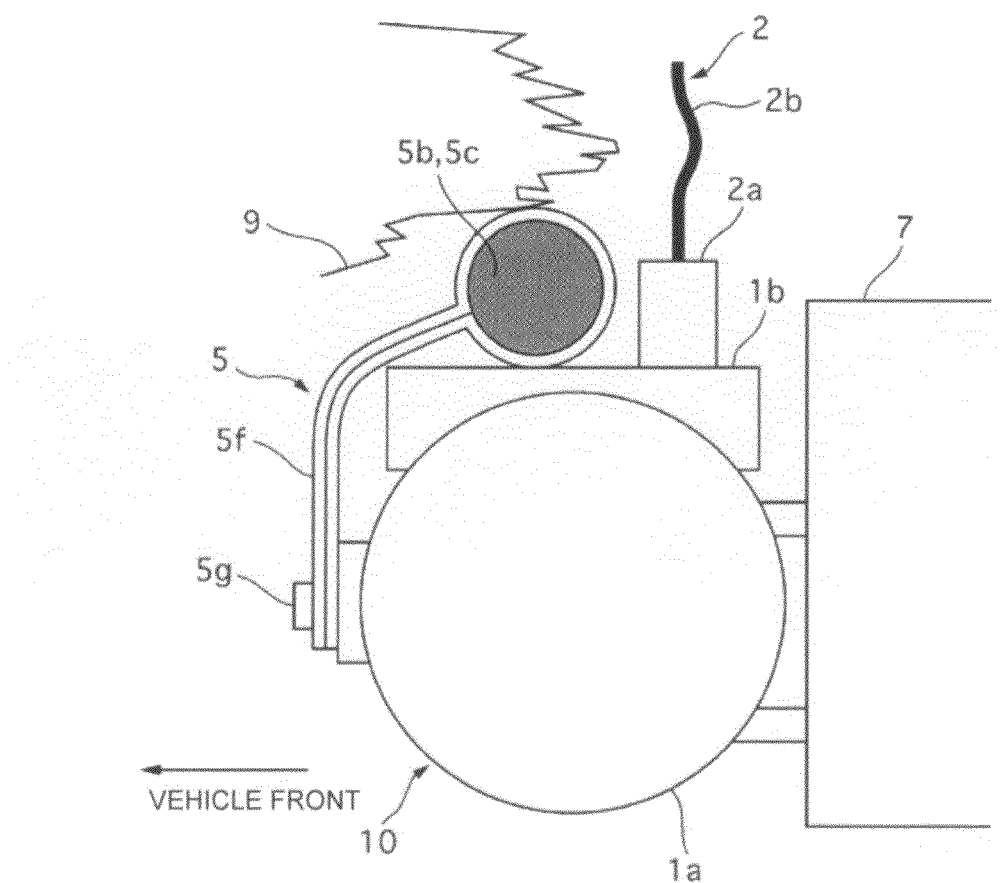
FIG. 5 shows an electric compressor with a pipe structure according to one or more embodiments of the present invention during a collision.

Thus, as shown in FIG. 5, even when the collision energy is great and the distance rearwards of the rigid part 9 can not be suppressed, the rigid part 9 rides on the bracket 5f, so that it is possible to prevent the other part 9 from coming into contact with the connector portion 2a, and to protect the connector portion 2a from damage. Further, the collision energy can be absorbed by the plastic deformation of the bracket 5f. Therefore, as compared to where there is no bracket 5f, the retreating amount of the part 9 which is forced back a distance s can be suppressed to distance s or lower by having the bracket 5f.

In one or more embodiments of the present invention, the bracket 5f wraps around the circumference of the aluminum pipe portion 5c and the two ends of the bracket 5f are fixed to the compressor motor section 1a. As a method for supporting the air conditioner pipe using the bracket, brazing or swaging may be employed. The bracket 5f wraps around a circumference of the aluminum pipe portion 5c, and the two ends of the bracket 5f are fixed to the vehicle body. With this configuration, even when a great collision load is received during a collision and the bracket 5f is largely plastically deformed, the possibility is decreased that the aluminum pipe portion 5c comes out from the bracket 5f and comes into contact with the connector portion 2a of the high voltage harness 2.

In accordance with one or more embodiments of the present invention, the pipe structure of the electric compressor 10 has one or more of the following advantages.

Because the bracket 5f which supports the aluminum pipe portion 5c is positioned forward of the connector portion 2a, the supporting rigidity of the aluminum pipe portion 5c is increased, and the aluminum pipe portion 5c can absorb more collision energy.

Since a portion of the aluminum pipe portion 5c between the connector portion 5d and the bracket 5f is positioned forward of the connector portion 2a with respect to the vehicle, the bracket 5f functions as a reinforcing member which protects the connector portion 2a during a head-on collision, and it is possible to reduce damage to the connector portion 2a.

The bracket 5f wraps around the circumference of the aluminum pipe portion 5c at least once, and both ends of the bracket 5f are plate-shaped members fixed to the compressor motor section 1a of the electric compressor 10. Therefore, even if the bracket 5f receives a great collision load during a collision and is largely plastically deformed, the possibility is decreased that the aluminum pipe portion 5c comes out from the bracket 5f and comes into contact with the connector portion 2a of the high voltage harness 2.

Even when the bracket 5f is plastically deformed rearwards by a head-on collision, a gap which functions as a contact-avoiding margin is secured between the bracket 5f and the connector portion 2a. Therefore, even when the bracket 5f is forced rearwards due to the plastic deformation, it is possible to avoid the contact with the connector portion 2a.

The vertical distance u between the uppermost point of the bracket 5f to the upper front edge A of the electric compressor 1 is set to be less than the longitudinal distance v from the upper front edge A of the electric compressor 1 to the connector portion 2a of the high voltage harness 2. Thus, the distance the bracket 5f is plastically deformed rearwards can be suppressed to u or less, and it is possible to avoid contact with the connector portion 2a.

Since the diameter of the aluminum pipe support portion of the bracket 5f is set greater than the height of the connector portion 2a, during a head-on collision, the part 9 plastically deforms the bracket 5f and rides on the upper surface of the bracket 5f. Even when the bracket 5f is forced further rearwards, it is possible to more reliably avoid the contact with the connector portion 2a.

In accordance with one or more embodiments of the present invention, a refrigerant discharging air conditioner pipe may be positioned forward of the harness connecting portion instead of the refrigerant suction air conditioner pipe, or both the air conditioner pipes may be positioned forward of the harness connecting portion with respect to the vehicle. In accordance with one or more embodiments of the present invention, a plurality of brackets for supporting the air conditioner pipe may be provided.

In a pipe structure of an electric compressor according to one or more embodiments of the present invention, at least a part of the air conditioner pipe is disposed above the electric compressor and forward of the harness connecting portion. Therefore, In accordance with one or more embodiments of the present invention, during a head-on collision, a load caused by the collision can be received by the air conditioner pipe, and collision energy transmitted to the harness connecting portion can be reduced. Further, In accordance with one or more embodiments of the present invention, since the air conditioner pipe is an indispensable part of an air conditioner in a vehicle, additional parts may not be necessary as compared with the conventional structure. That is, because the air conditioner pipe, which is an indispensable part of the air conditioner, absorbs the collision energy, damage to the harness connecting portion is reduced without adding extra parts. As a result, it may be possible to prevent the harness connecting portion from being damaged.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A pipe structure of an electric compressor, comprising:
   an electric compressor disposed in an engine compartment of a vehicle and configured to be driven by a battery power source to compress a refrigerant;
   a harness connecting portion disposed on an upper surface of the electric compressor and electrically connecting a harness to the electric compressor; and
   a pipe connecting portion disposed forward of the harness connecting portion and connecting an air conditioner pipe to the electric compressor,
   wherein at least a part of the air conditioner pipe is disposed above the electric compressor;
   wherein the at least a part of the air condition pipe is disposed forward of the harness connection portion and configured to protect the harness connection portion in the event of a collision.

2. The pipe structure of the electric compressor according to claim 1, wherein
   the at least a part of the air conditioner pipe extends laterally and is disposed forward of at least the harness connecting portion.

3. The pipe structure of the electric compressor according to claim 1, wherein
   the electric compressor comprises a bracket which supports the air conditioner pipe.

4. The pipe structure of the electric compressor according to claim 3, wherein
   a portion of the air conditioner pipe between the pipe connecting portion and the bracket is positioned forward of the harness connecting portion.

5. The pipe structure of the electric compressor according to claim 4, wherein
   the bracket wraps around a circumference of the air conditioner pipe at least once, and both ends of the bracket are plate-shaped members fixed to the electric compressor.

6. The pipe structure of the electric compressor according to claim 3, wherein
   the bracket is positioned to maintain clearance with the harness connecting portion when plastically deformed rearwards, such that contact between the bracket and the harness connecting portion is avoided during a head-on collision.

7. The pipe structure of the electric compressor according to claim 6, wherein
   the bracket is disposed on a front surface of the electric compressor, and
   a vertical distance between an uppermost point of the bracket and the upper surface of the electric compressor is less than a longitudinal distance between the harness connecting portion and an upper front edge of the electric compressor.

8. The pipe structure of the electric compressor according to claim 7, wherein
   a diameter of a portion of the bracket wrapping around the air conditioner pipe is greater than a vertical height of the harness connecting portion.

9. A piping method for an electric compressor, comprising:
   protecting a harness connecting portion in the event of a collision from parts located in front of the electric compressor by disposing an air conditioner pipe in front of the harness connecting portion;
   wherein the harness connection portion is disposed on an upper surface of the electric compressor.

10. A pipe structure of an electric compressor, comprising:
    an electric refrigerant compressing means;
    an electrically connecting means for electrically connecting a harness to the electric refrigerant compressing means;
    wherein the electrically connecting means is disposed on an upper surface of the electric refrigerant compressing means; and
    a pipe connecting means disposed forward of the electrically connecting means for connecting an air conditioner pipe to the electric refrigerant compressing means,
    wherein at least a part of the air conditioner pipe is disposed above the electric compressing means;
    wherein the at least a part of the air condition pipe is disposed forward of the harness connection portion and configured to protect the harness connection portion in the event of a collision.

* * * * *